Patented Jan. 12, 1954

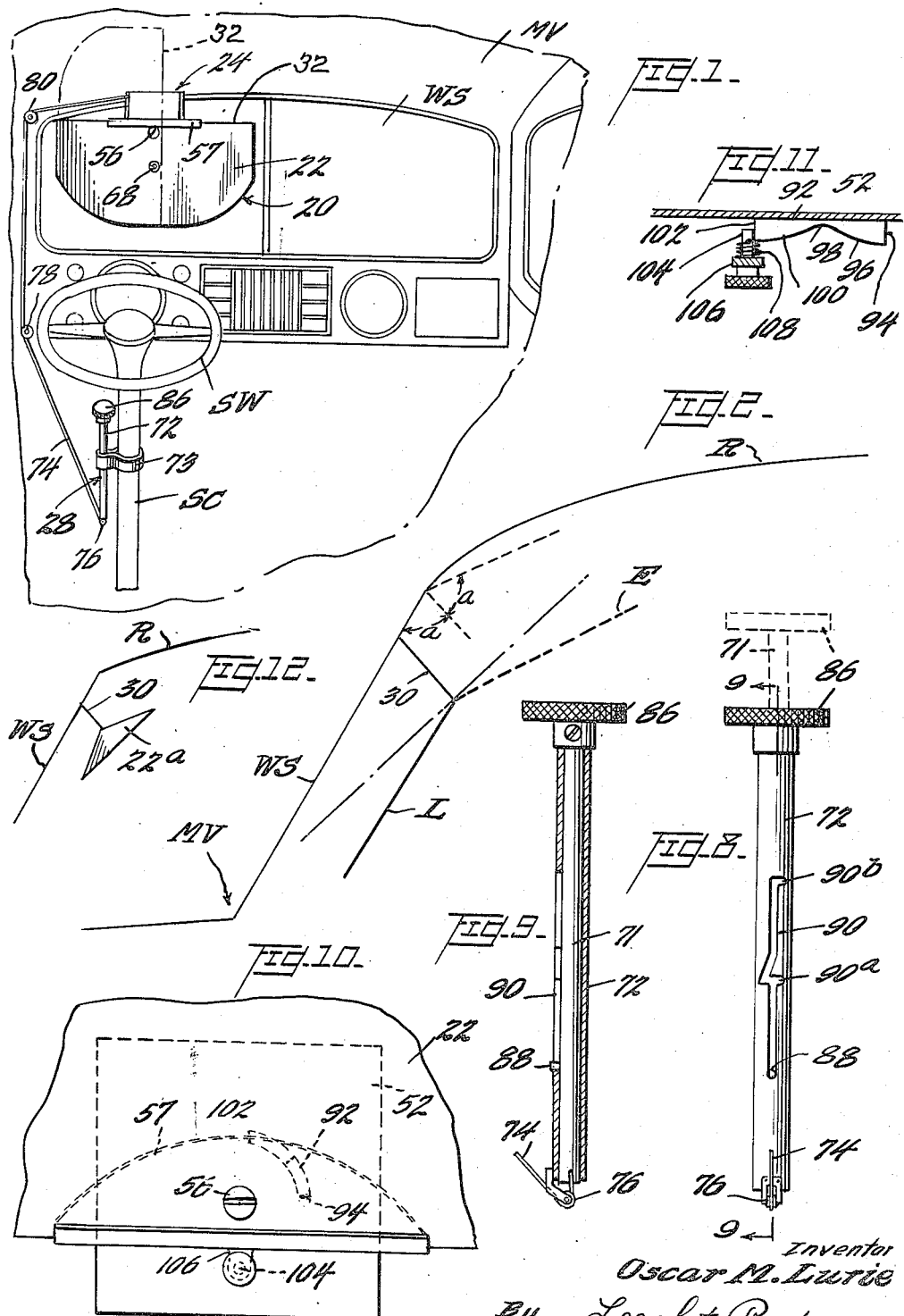

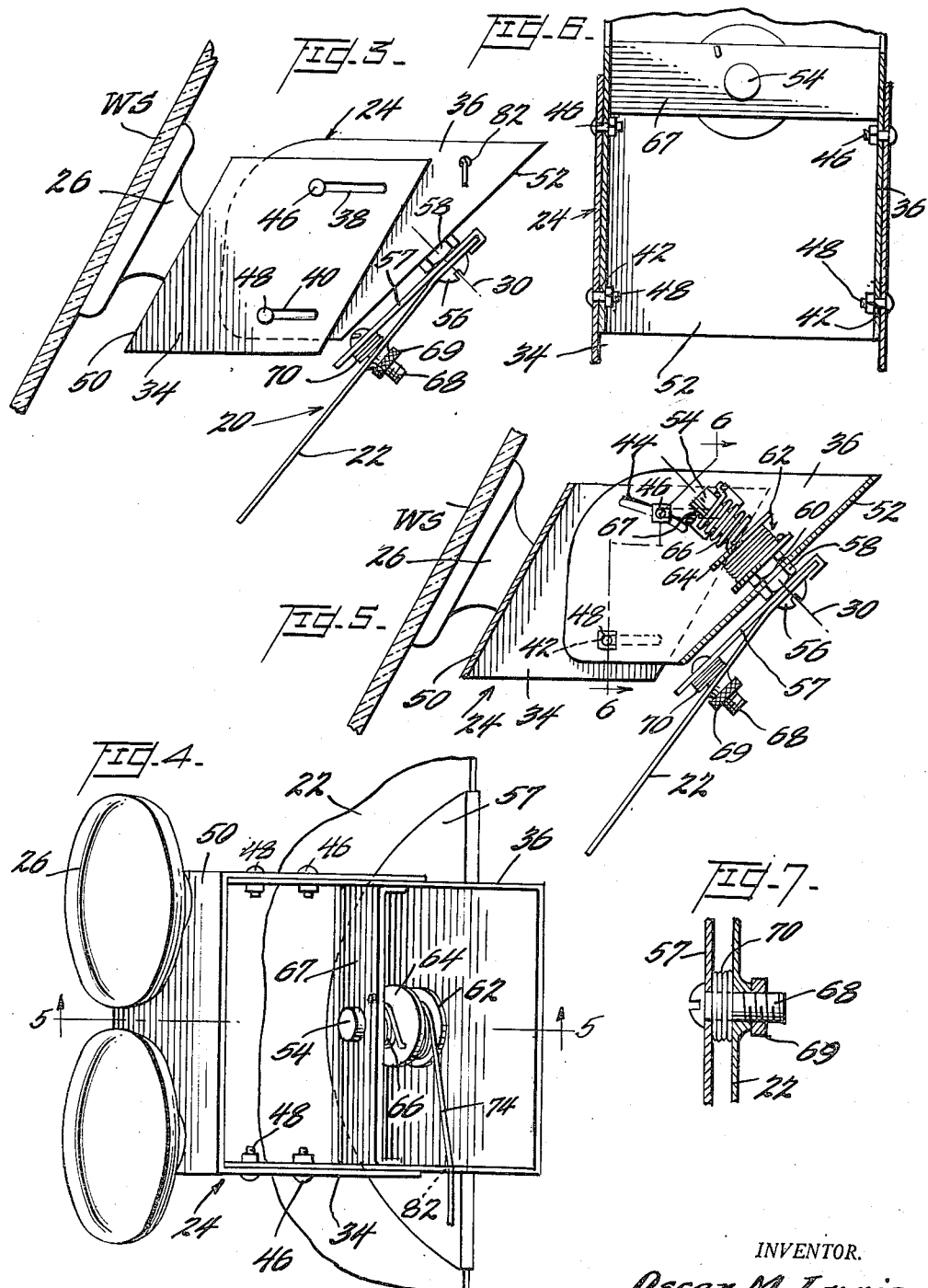

2,665,939

UNITED STATES PATENT OFFICE 2,665,939

ADJUSTABLE ANTIGLARE SHIELD

Oscar M. Lurie, Bethesda, Md., assignor to Charles P. Liff, Chevy Chase, Md.

Application November 17, 1950, Serial No. 196,237

11 Claims. (Cl. 296—97)

This invention relates to an adjustable antiglare shield for use in combination with the normal glass windshield of a motor vehicle.

The light modifying shields hitherto patented and available for this purpose have a number of objectionable limitations. Some of these prior shields involve a plurality of fanlike elements, the edges of which overlap in use so that the light transmitting properties are non-uniform. Others are constructed and arranged to pivot toward the vehicle driver, or to be limited in movement to swinging or tilting over the windshield area. Where provision has been made in other forms for complete removal of the shield from the windshield area, elaborate and expensive alterations of the vehicle construction have been necessary.

Therefore, it is a principal object of this invention to provide a glare shield that may be mounted on the inside of any conventional windshield and pivotally moved between an operative position over the windshield to an inoperative position above the windshield and adjacent the roof or top of the vehicle.

It is a further important object of the invention to provide a glare shield of the type indicated that may be conveniently and easily mounted on any motor vehicle for selective pivotal movement to a position wholly protecting a selected area of the windshield, one protecting only a vertically divided half of the selected area, and an inoperative one above and substantially removed from the windshield.

Another major object of this invention is to provide a glare shield having an axis of pivotal adjustment that is at least approximately parallel to the plane bisecting the obtuse angle formed by the intersecting planes of the windshield and roof of the vehicle.

A further important object of this invention is to provide a pivotally mounted glare shield of the type described having a straight edge adjacent the pivotal axis and adjustable to horizontal positions in which the windshield is respectively covered and uncovered, and a vertical position so that, of the portion of the windshield directly in front of the driver, the half which is adjacent the oncoming traffic is protected and the other half remains clear for forward observation by the driver.

A further object of the invention resides in the provision of novel support means for detachably mounting the glare shield and its pivotal axis on the upper part of a windshield and for adjusting the relative angle between the pivotal axis of the shield and the support means.

Other specific objects include the provision of means for adjusting the spacing of the shield itself from the adjacent surface of the windshield and of means for adjusting the angular relation of the plane of the glare shield relative to the axis about which it pivots.

A still further object of the invention is to provide means accessible to the driver holding the steering wheel for rotatably positioning the glare shield from that point.

Another and specific object is to provide the pivotal mounting means for the glare shield with stop means to which the glare shield may be rotated, and then released for rotation to another selected position.

These and other objects contributing to efficiency in use and adjustability for accommodation to various kinds of motor vehicles will be more fully understood from the following detailed description of a preferred embodiment of the invention, taken in connection with the accompanying drawings, in which:

Fig. 1 is an elevational view of a conventional automobile vehicle looking forward from the driver's seat to the windshield and showing the glare shield of this invention mounted for use;

Fig. 2 is an enlarged diagrammatic, longitudinal section of the vehicle of Fig. 1 indicating the various operative relations of the glare shield to the windshield and top;

Fig. 3 is a fragmentary enlarged side elevation of the glare shield mounted on the windshield;

Fig. 4 is a top plane view of Fig. 3;

Fig. 5 is a longitudinal section taken on the line 5—5 of Fig. 4;

Fig. 6 is a cross-sectional view taken on the irregular line 6—6 of Fig. 5;

Fig 7 is an enlarged longitudinal section showing details of an adjusting device appearing in Figs. 3 and 5;

Fig. 8 is a side elevation of manual means for operating the glare shield from a point adjacent the steering wheel of the vehicle;

Fig. 9 shows a longitudinal section taken on line 9—9 of Fig. 8;

Fig. 10 is a fragmentary elevational view of modified mounting and stop means for the glare shield;

Fig. 11 is a detail view partially sectioned showing stop means for limiting movement of the modified glare shield of Fig. 10; and Fig. 12 is a diagrammatic section of a vehicle similar to Fig. 2 but showing a glare shield of conical segment shape.

The manner in which the glare shield of this invention is used is best illustrated in Fig. 1. In this figure a motor vehicle MV having a windshield WS and a top or roof R is shown with a steering column SC and a steering wheel SW in the conventional position for operation by a driver seated at the left side of the vehicle facing forward. The reference numeral 20 refers to the glare shield generally, which comprises a light modifying shield member 22 preferably of flexible semi-transparent plastic, pivotally mounted adjacent the midportion of one edge on a support structure 24. The support structure 24 is preferably detachably secured to the upper part of the inside of the windshield by means of spaced, coplanar gripping members 26 shown in Fig. 4. These members may be in the form of suction cups or friction gripping means defining an extended gripping surface. Again referring to Fig. 1, a remote controlled operating device 28 is mounted on the steering column SC beneath the steering wheel SW for remotely adjusting the position of the shield 22.

In the preferred embodiment the readily flexible glare shield 22 is shaped to provide an elongated edge portion and may be of generally rectangular shape with rounded corner portions at the lower corners. A pivotal axis 30 for the shield 22 is positioned at the midpart of an upper straight edge portion 32 thereof. It will be observed in Fig. 2 that this pivotal axis 30 is adjacent but below the top edge of the windshield WS and has a parallel relation to the bisector of the obtuse angle formed by the general planes of the roof R and said windshield. This bisector is shown as a dotted line between the equal angles *a* and *a*. The angle which the pivotal axis 30 makes with the windshield W is therefore less than 90 degrees. For this reason the flexible glare shield member 22 is arranged so that the plane thereof is deflected somewhat away from perpendicular intersection with the pivotal axis 30.

Referring now to Fig. 3, the support structure 24 includes a U-shaped bracket 34 carrying the spaced gripping members 26 on the outside of the portion connecting the leg portions, and another interfitting oppositely directed U-shaped bracket 36 carrying the shield 22. Each of the legs of the U-shaped bracket 34 has an upper and lower slot 38 and 40 extending in spaced parallel relation and aligned with the corresponding slots of the other leg. The inwardly disposed legs of the U-shaped bracket 36 are each formed with a circular lower aperture 42 oppositely disposed, and an opposed pair of aligned arcuate upper slots 44 (Fig. 5). A connecting pin or bolt 48 extends between one aperture 42 and one lower slot 40 at each side of the support structure 24. The straight upper slots 38 and arcuate upper slots 44 are likewise provided with connecting pins or bolts 46 extending therethrough. The aligned lower bolts 48 are arranged as a radius center for swinging movement of the arcuate slots 44. These connections are for the purpose of permitting adjustment of the angular relation between the plane of the gripping members 26 on a leg-connecting plane portion 50 of inner bracket 34 and the shield 22 carried on outer bracket 36, and also extension of the support structure 24. It will also be observed that the shield pivotal axis 30 is perpendicular to the plane of a corresponding connecting portion 52 extending between the legs of bracket 36.

The pivotal axis 30 is defined by a bolt 54 extending through the connecting portion 52 and the upper edge portion of the glare shield 22. The bolt 54 has a head 56 which clamps the shield 22 against a mounting plate 57 having an edge portion bent over the straight edge 32 of the shield. The inner side of the mounting plate 57 engages a nut 58 on the outer side of connecting portion 52, which nut 58 and a companion nut 60 on the inner side of the bracket portion 52 fix the bolt 54 in position while permitting rotation. As shown in Figs. 4 and 5, the inner portion of the bolt 54 carries a reel or spool 62 having its innermost end flange 64 secured to one end of a torsion spring 66, the other end of which is connected to a cross-plate 67 extending between the legs of bracket 36. The glare shield 22, bolt 54 and spool 62 rotate together and tension the spring 66 so that the shield 22 will be returned to a predetermined position when the spring opposed rotating force is removed.

Figs. 5 and 7 show the manner in which a bolt 68 is used as an angular deflecting means between the flexible glare shield 22 and its mounting plate 57. This bolt 68 extends through opposite openings in the shield 22 and plate 57 and has a thumb nut 69 on its threaded outer end, with a compression spring 70 mounted thereon between said shield and plate. The angularity can be increased by loosening the nut 69 and permitting the spring 70 to expand from the fully contracted position shown.

When the torsion spring 66 is not used on the shaft of the bolt 54 the shield 22 can be rotated manually and the frictional engagement of the nuts 58 and 60 with the connecting portion 52 of bracket 36 will hold the shield 22 in the angular position to which it is adjusted. It is preferable, however, to provide means for angularly adjusting the shield which can be operated without removal of the driver's hand from the steering wheel SW or obstruction of the field of vision by his adjusting arm. These remotely adjusting means include a manually operated plunger device 71 reciprocating in a cylinder 72 mounted by a clamp 73 on the steering column SC immediately below the steering wheel SW as shown (Fig. 1), or to any other convenient part of the vehicle. A light, flexible cable 74 is connected to and encircles the reel 62 on the shaft 54. The other end of this cable 74 is connected to the lower end of the plunger device 71 and extends therefrom successively over guide pulleys 76, 78 and 80 in a non-obstructing position relative to the windshield WS, and across the top of the windshield to enter the support structure 24 through an opening 82 in the adjacent leg portion of the U-shaped bracket 36 (Fig. 3). From the aperture or opening 82 the cable is lead to the reel 62 to act against the torsion spring 66.

The upper end of the plunger device 71 has an operating knob 86 for raising or lowering the plunger. The portion of the plunger device 71 within the cylinder 72 carries a lateral pin 88 engaged by a bayonet slot 90 in the side wall of the cylinder 72. This slot 90 is shaped to maintain the plunger device 71 in half and fully extended positions respectively upon locking rotation, as will be obvious from Fig. 8 in which a locking portion 90*a* is effective at the half position and another locking portion 90*b* serves the full position.

In the modified construction shown in Fig. 10 an arcuate cam means 92 is secured on the outer face of the connecting portion 52 of bracket 36. One end of the cam means 92 forms a stop shoulder 94 joined by a receding cam surface 96 to a low portion 98 connected by a rising cam surface 100 with a second stop shoulder 102. There is an angular space of 90 degrees between the stop shoulders 94 and 102. A stop pin 104 carried in a lug 106 extending centrally and outwardly from the bent edge portion of the mounting plate 57 is positioned for cooperation with this arcuate cam means 92 and has a compression spring 108 acting between its inner end portion and the lug 106 to abut the shoulder portions of the cam means except when released by outer movement against the spring action. Considering Fig. 10 and having in mind that the glare shield 22 is to be rotated counter-clockwise from its position above the windshield WS and adjacent the roof R, it will be apparent that the pin will engage the first shoulder 94 after angular movement of 90 degrees, so that the shield 22 will be stopped with its edge 32 vertical as shown in Fig. 1. When released over this shoulder, continued movement of the shield 22 with its mounting plate 57 will be unobstructed until an additional angular movement of 90 degrees is made. At this time the stop pin 104 will snap inwardly toward the bracket portion 52, as shown in Fig. 11, so that the glare shield 22 will be maintained in fully protecting position as shown by full lines in Fig. 1. It will however, be automatically restored to its fully inoperative position upon manual release of the stop pin 104 and by reason of the restoring action of the torsion spring 66 on the bolt 54.

The operation of the glare shield apparatus will now be summarized and its advantages pointed out. The particular angular relation of the pivotal axis 30 with respect to the windshield WS and roof R as shown in Fig. 2 permit the glare shield 22 to be rotated from a horizontal position substantially fully protecting the driver's side of the windshield WS to a completely unobstructing horizontal position adjacent the inside of the roof R, all without modification of or interference with any part of the vehicle structure. The required spacing between the glare shield 22 and the windshield WS is minimized by angular deflection of the plane of shield 22 by operation of the bolt 68 as previously explained. The thus deflected plane glare shield 22 generates a solid of revolution and lies approximately parallel to the windshield WS in its lowered position L and to the roof R in its elevated position E, as will be understood from Fig. 2. The companion broken inner lines extending from the axis 30 in this diagram represent the intermediate 90 degree position of the glare shield 22 in which the straight edge portion 32 is vertical as shown by the dotted lines in Fig. 1.

It will be appreciated that the use of a shield formed as a conical segment with its axis lying along the pivotal axis 30 will always have the element nearest the roof or windshield in parallel relation thereto. A thus modified glare shield 22a shaped as a minor conical segment and having its apex portion secured at the rotational axis 30 is illustrated in Fig. 12. The position shown is that in which the shield is partially down to cover the half of the windshield in front of the driver and adjacent the oncoming traffic.

Adjustment of the glare shield for proper spacing from the windshield WS of various types of motor vehicles is accomplished by means of the slots 38, 40 and 44, and apertures 42 of the U-shaped brackets 34 and 36, with bolts 46 and 48 being tightened to secure the desired adjustment. The opposite pair of arcuate slots 44 of the U-shaped bracket 36 permits angular adjustment of the shield pivotal axis 30 to provide spaced and at least approximately parallel relationship with the windshield WS and the roof R in the completely lowered and elevated positions.

Assuming that the glare shield 22 is in the extreme elevated and horizontal position shown by dotted lines in Fig. 1, elevation of the plunger device 71 by the hand of the driver resting on the steering wheel SW will first rotate the shield 22 to the 90 degree position in which the straight edge 32 is represented by a dotted vertical line. The shield can be maintained in this position by rotation of the plunger device 71 and engagement of its locking pin 88 with the appropriate horizontal notch portion 90a of the bayonet slot 90. Opposite plunger rotation and further elevation of the plunger will cause the glare shield 22 to be rotated to a fully lowered and protecting position with its straight edge 32 again horizontal as shown by full line in Fig. 1. In this position also the locking pin 88 can be rotated into the other locking notch portion 90b at the upper end of the bayonet slot 90.

When the cam means 92 and the stop pin 104 of the Fig. 10 modification are used, it will be necessary to release the stop pin 106 when the half operative position of stop shoulder 94 is reached if a full shielding position is desired. It is also necessary to release the stop pin 106 from stop shoulder 102 when half operative or fully inoperative position is again desired.

In night driving the driver can quickly turn the glare shield 22 from inoperative to the left half windshield protecting position by a short upward pull on plunger rod 71, the stop shoulder of slot 90a preventing further turning. Release of plunger rod 71 results in immediate restoration of the shield 22 to inoperative position by action of the torsion spring 66. Rotation of rod 71 so that its pin 88 locks in the slot notch portion 90a will maintain the shield 22 in the half protecting position when desired. The slot notch portion 90b is effective to maintain the shield 22 in full protecting position such as may be required for daytime driving against sunlight. The stop pin 104 and stop shoulders 94 and 102 when used will permit release and retraction of the plunger rod 71 after full shielding position is attained, and will make use of the locking notch portion 90b unnecessary. When no torsion spring is used, the stop pin 104 and cam means 92 may be employed for predetermined angular positioning and retention of shield 22 in fully operative position.

It will now be fully understood that this invention provides an improved glare shield arrangement which may be readily operated without removing the hands from the steering wheel, and which can be so used that of the windshield portion directly in front of the driver the half adjacent the oncoming traffic is shielded while the other half remains unshielded. For daytime driving in bright sunlight or for driving at night under special conditions the shield may be rotated and maintained in a fully lowered position in which substantially all the driver's side of the windshield is protected against glare.

While flexible, sheet plastic material is preferred for safety reasons and economy, other well-known types of light modifying substances may be used for the glare shield. It is also to be understood that the glare shield device of this invention is applicable to curved as well as plane surface windshields.

As various modifications can be made in details of construction and arrangements of parts without departing from the principles of this invention, the disclosed embodiment is for purposes of illustration only, and no limitation is intended other than that specified in the appended claims.

Having thus described my invention, what I claim is novel and desire to secure by Letters Patent is:

1. In combination with a motor vehicle having a windshield and a roof the general planes of which intersect at an obtuse angle: a light transmitting glare shield extendible over a large portion of the inside of the windshield; and a single pivot axis means fixedly disposed at a point adjacent the top of the windshield and secured to an edge portion of the glare shield to rotatably mount the glare shield at the inside of the windshield, the axis of rotation of said pivot axis means extending substantially parallel to the bisector of said obtuse angle to accommodate rotation of the glare shield between operative position over the windshield to inoperative position in which it extends in spaced relation over the inside of the roof.

2. In combination with a motor vehicle having a windshield and a roof the general planes of which intersect at an obtuse angle: a glare shield consisting of a sheet of flexible plastic material extendible over a large portion of the inside of the windshield and having a straight edge portion; and a single pivot axis means fixedly supported at a point adjacent the top of the windshield and secured to said straight edge portion rotatably mounting the glare shield in spaced relation to the inside of the windshield, the axis of rotation of said pivot axis means extending substantially parallel to the bisector of said obtuse angle to accommodate rotation of the glare shield between operative position over the windshield to inoperative position in which it extends in spaced relation over the inside of the roof.

3. In combination with a motor vehicle having a windshield and a roof the general planes of which intersect at an obtuse angle: a light modifying glare shield of readily flexible nonbreakable material extendible over a large portion of the inside of the windshield and having a straight edge portion; a single pivot axis means fixedly supported at a point adjacent the top of the windshield and secured to the midpart of said straight edge portion rotatably mounting the glare shield in spaced relation to the inside of the windshield, the axis of rotation of said pivot axis means intersecting the plane of the windshield and lying in a plane perpendicular thereto, and being disposed a sufficient distance from the more closely adjacent outside edge of the windshield to accommodate rotation of the glare shield between operative position over the windshield to inoperative position in which it extends in spaced relation over the inside of the roof; and operating member connected with said pivot axis means and extending across the top of the windshield and down one side thereof to a position accessible to a person operating the vehicle for rotating said glare shield to selected positions.

4. An antiglare attachment for motor vehicles comprising a support structure having an elongated portion; mounting means on the outside of said elongated portion adapted to support said support structure at the inside of a windshield; a straight pivot shaft mounted in the support structure with its pivot axis intersecting the plane of said support structure and lying in a plane perpendicular thereto; a glare shield adapted to cover a large portion of the windshield and having an edge portion directly secured on one end portion of said pivot shaft and extending generally transversely thereof for rotation of said glare shield from a spaced position over the windshield to a position above the windshield; and means fixedly carried by said shaft and having a portion engaging said glare shield at a point spaced from the edge portion thereof and from the axis of said shaft for deflecting said glare shield in a direction away from the windshield.

5. The combination claim 4 in which said deflecting means comprises a plate mounted on the end portion of the said shaft adjacent the glare shield, and an adjusting screw extending between said plate and glare shield at one side of said shaft.

6. An antiglare attachment for motor vehicles comprising a support structure including spaced elongated portions, windshield mounting means on the outside of one of said elongated portions, a pivot shaft mounted in and having an end extending on the outside of the other of said elongated portions, the axis of said pivot shaft intersecting the general plane of the windshield engaging surface of said mounting means at an acute angle and lying in a plane perpendicular to said general plane, a glare shield adapted to cover a large portion of the windshield and secured by an edge portion to the extending end of said shaft, and deflecting means carried by said pivot shaft and connected with said glare shield at a point spaced laterally from the axis of said shaft for bending said glare shield away from the windshield with which it is used.

7. The combination of claim 6 including means adjustably interconnecting said elongated portions to vary their spacing and angular relation.

8. An antiglare device for motor vehicle windshields, said device comprising a pair of interfitted oppositely directed U-shaped members each having a planar portion connecting its legs and being in opposed relation to each other, the legs of the outer of said U-shaped members each being formed with spaced pairs of lengthwise parallel slots, and the legs of the inner of said U-shaped members each being formed with a circular aperture and a spaced arcuate slot, the circular aperture in each leg of said inner U-shaped member being alignable with one of the slots of the opposite leg of said outer U-shaped member, and the spaced arcuate slot in each leg of said inner U-shaped member extending across the other slot of said opposite leg of said outer U-shaped member; pin connections between said slots and apertures of the U-shaped members; attaching means carried by the planar portion of the outer U-shaped member; a pivot shaft mounted perpendicularly on the planar portion of the inner U-shaped member; and a readily flexible, non-breakable glare shield having an edge portion mounted on the outer end portion of said pivot shaft for position adjusting rotation about the axis thereof.

9. An antiglare device for motor vehicle windshields, said device comprising a pair of interfitted oppositely U-shaped members each having a planar portion connecting its legs and being in opposed relation to each other; a pivot shaft mounted perpendicularly on the planar portion of the inner U-shaped member, the legs of the outer of said U-shaped member each being formed with spaced pairs of lengthwise parallel slots, and the legs of the inner of said U-shaped members being formed with a circular aperture and a spaced arcuate slot, the circular aperture in each leg of said inner U-shaped member being alignable with one of the slots of the opposite leg of said outer U-shaped member, and the arcuate slot in each leg of said inner U-shaped member extending across the other slot of said opposite leg of said outer U-shaped member, pin connections between said slots and apertures of the U-shaped members; attaching means on the planar portion of the outer U-shaped member; a readily flexible, plastic glare shield having an extended edge portion mounted at its midpart on the outer end portion of said pivot shaft for position adjusting rotation about the axis thereof; and deflecting means carried by said shaft and connected with said glare shield at a point spaced laterally from axis of said shaft for bending said glare shield away from the windshield with which it is used.

10. An antiglare attachment for motor vehicles comprising an elongated support structure; mounting means on said support structure adapted to secure said support structure to the inside of a windshield; a pivot shaft mounted in said support structure in a plane perpendicular thereto and having an end portion extending outwardly thereof; a reel secured on an intermediate part of said pivot shaft for rotation in a plane parallel to said support structure; resilient torsion acting means connected between said support structure and said reel to restore the said pivot shaft to a selected position after rotation to another position against the resistance of said torsion acting means; a glare shield having an edge portion directly secured on said end portion of said pivot shaft in perpendicular relation thereto for rotation of said glare shield from a spaced position over the inside of the windshield to a position above the windshield; and a cable connected with said reel for rotating said glare shield by operation from a remote point.

11. An antiglare attachment for motor vehicles comprising a support structure having an elongated portion, a plurality of coplanar gripping members mounted on the outside of said elongated portion and adapted to secure said support structure to the inside of a windshield; a pivot shaft mounted in the support structure opposite from the gripping members, the axis of said pivot shaft intersecting the general plane of the gripping members at an acute angle an lying in a plane perpendicular to said general plane; a readily flexible plastic glare shield adapted to cover a large portion of the windshield and having a generally straight edge portion the midpart of which is mounted on said pivot shaft for rotation as a surface from a spaced position over the windshield to a position above the windshield; deflecting means carried by said pivot shaft and connected with said glare shield at a point spaced laterally from the axis of said shaft for bending said glare shield away from the windshield with which it used; and a flexible manually operable member connected with said pivot shaft for rotating the glare shield from a remote position.

OSCAR M. LURIE.

References Cited in the file of this patent

UNITED STATES PATENTS

| Number | Name | Date |
|---|---|---|
| 1,429,034 | Haseltine | Sept. 12, 1922 |
| 1,446,946 | Surbeck et al. | Feb. 27, 1923 |
| 1,587,144 | Burk | June 1, 1926 |
| 1,988,511 | Rabbit | Jan. 22, 1935 |
| 2,286,935 | Schendler | June 16, 1942 |

FOREIGN PATENTS

| Number | Country | Date |
|---|---|---|
| 276,212 | Great Britain | Aug. 25, 1927 |
| 285,750 | Great Britain | Feb. 23, 1928 |